United States Patent [19]
Butman, Jr.

[11] 4,377,764
[45] Mar. 22, 1983

[54] END WINDING SUPPORT FOR EXCITER WINDING BAR

[75] Inventor: Thomas R. Butman, Jr., Albany, N.Y.

[73] Assignee: General Electric Company, Schenectady, N.Y.

[21] Appl. No.: 302,963

[22] Filed: Sep. 17, 1981

Related U.S. Application Data

[63] Continuation-in-part of Ser. No. 178,867, Aug. 18, 1980, abandoned.

[51] Int. Cl.³ .............................................. H02K 3/46
[52] U.S. Cl. ................................... 310/260; 310/184; 310/201; 310/271
[58] Field of Search .............. 310/165, 179, 260, 270, 310/271, 272, 201, 198, 208, 180, 184, 254, 192

[56] References Cited

U.S. PATENT DOCUMENTS

| 3,132,296 | 5/1964 | Nippes ................................ 322/58 |
| 3,135,888 | 6/1964 | Coggeshall .......................... 310/271 |
| 3,348,085 | 10/1967 | Coggeshall .......................... 310/260 |
| 3,408,517 | 10/1968 | Willyoung ........................... 310/198 |
| 3,437,859 | 4/1969 | Gibbs et al. .......................... 310/260 |
| 3,479,543 | 11/1969 | Drexler ................................ 310/162 |
| 3,566,010 | 2/1971 | Drexler et al. .................. 174/138 R |
| 3,691,416 | 9/1972 | Drexler ................................ 310/260 |
| 3,949,257 | 4/1976 | Cooper ................................ 310/260 |

FOREIGN PATENT DOCUMENTS 874296 8/1961 United Kingdom ................ 310/260

OTHER PUBLICATIONS

GENERREX-PPS (Potential Power Source) Excitation System for Wisconsin Power and Light, Edgewater 5—Cotzas and Crenshaw, Apr. 27-29, 1981.

*Primary Examiner*—R. J. Skudy
*Attorney, Agent, or Firm*—John F. Ahern

[57] ABSTRACT

An improved end winding support system for "P" bars is disclosed wherein each "P" bar extends axially from one end of a stator slot of the stator core of a dynamo-electric machine which has an integral excitation system. The support system includes means for affixing each of the "P" bars to stator bars at three different locations in the end winding region and especially in such a manner that the inner section close to the stator core includes a slip plane capable of accommodating relatively small differential thermal expansion displacements in the axial direction between the "P" bar and the stator bars.

11 Claims, 7 Drawing Figures

END WINDING SUPPORT FOR EXCITER WINDING BAR

CROSS REFERENCES TO RELATED APPLICATION

This application is a continuation-in-part of my co-pending application Ser. No. 178,867, now abandoned filed on Aug. 18, 1980 and assigned to the same assignee as the present invention.

BACKGROUND OF THE INVENTION

1. Field of the Invention

This invention relates to supporting each exciter winding bar in the end winding region of a dynamoelectric machine so as to permit a certain degree of axial expansion as the exciter winding bar extends from one end of the stator slot, while at the same time securing the exciter winding bar against radial and circumferential motion.

2. Description of the Prior Art

Y. S. Hargett, in "Large Steam Turbine-Driven Generators", published by General Electric Company; Schenectady, N. Y., December 1978, provides a comprehensive description of dynamoelectric machines used in the production of electrical power. An end view of liquid-cooled generator windings is shown on Page 22 of the reference. For proper operation of the turbine-generator, certain auxiliary equipment is required, and one of the major items is an excitation system which functions to provide magnetizing power to the rotating generator field winding.

New designs for static excitation systems have been developed to displace the time-proven shaft-driven rotating exciters. For example, the GENERREX excitation system developed by General Electric Company, is intregral within the generator itself, and is described by G. M. Cotzas et al, "Description and Tests of the GENERREX Excitation System for Large Steam-Turbine Generators", IEEE Trans., Vol. PAS-95, No. 3, May/June 1976, pp. 803-810. The GENERREX-CPS (Compound Power Source) excitation system utilizes generator voltage and current, and was developed to meet the demand for both high initial response and high response ratio performance characteristics. Thus, excitation system response ratios of 3.5 have been supplied.

Although a definite trend is observed in recent years toward higher performance levels, significant interest remains for the based level of 0.5 response. The GENERREX-PPS (Potential Power Source) excitation system, incorporating a potential power source integral to the generator, was developed to meet this demand. It has been described in a paper by G. M. Cotzas et al, "GENERREX-PPS(Potential Power Source) Excitation System for Wisconsin Power & Light, Edgewater 5", presented at the Forty-Third Annual American Power Conference, Chicago, Ill., Apr. 27-29, 1981. The concept of GENERREX-PPS excitation system retains many desirable features of the GENERREX-CPS system. Accordingly, compact arrangement of equipment is provided for reduced space requirements and simplified maintainability of the generator. Control of generator field voltage is by means of direct high-speed thyristor action. The excitation potential source consists of a winding made up of three exciter winding bars or potential bars (each hereinafter referred to as a "P" bar) placed in the upper part of three selected stator winding slots in the stator core. An improved support system for securing the "P" bars of the excitation system in the slots of the stator core, in such a manner as to be able to withstand the operating conditions of the dynamoelectric machine and to avoid stresses caused under sudden short circuit conditions, is disclosed in the copending application of Butman, Jr. et al, U.S. Ser. No. 302,962, coassigned and filed concurrently herewith, and is incorporated herein by reference.

In the end winding region beyond the stator slots, a different form of support is required. A tying arrangement, for securing the armature bars (also referred to as stator bars) in the end portions of the stator winding, is shown in U.S. Pat. No. 3,437,859 issued Apr. 8, 1969 to E. E. Gibbs et al. In that patent, particularly in FIG. 8, there are shown circumferential hoops disposed at an angle with respect to the armature bars to provide support of the skewed end windings of the armature bars. The hoops in the patent to Gibbs et al, are attached to the armature bars by means of ties which are more particularly described in U.S. Pat. No. 3,566,010 issued Feb. 23, 1971 to Karl F. Drexler et al. In particular, the ties are formed by wrapping with strands of high tensile strength material impregnated with a curable resin. The strands are wound under tension about the portions which are to be affixed and the resin is subsequently cured to a rigid state. This tying process is generally referred to as "wrapping" and is hereinafter referred to as such. Other structures for retaining generator end windings are shown in the U.S. Pat. No. 3,135,888 issued June 2, 1964 to A. D. Coggeshall. The three patents cited above are incorporated herein by reference as background material for the present invention.

Prior art designs of dynamoelectric machines, while adequate for their intended purpose, do not provide restraints for the "P" bar against high radial and circumferential movement which may now arise in the GENERREX-PPS system due to excessive lateral forces such as are possible under electrical fault conditions. Nonetheless, the support system for such windings must be capable of allowing a certain amount of axial motion which arises primarily because of thermal expansion forces.

It is therefore an object of the present invention to provide an end winding support system for the "P" bars of the excitation system of a dynamoelectric machine.

It is a still further object of the present invention to provide an end winding support system for the "P" bars which permits a certain amount of axial expansion, while at the same time securing the windings against both circumferential and radial forces.

SUMMARY OF THE INVENTION

In accordance with the present invention, I have discovered an improved support system for a "P" bar in the end winding region of a dynamoelectric machine which has an integral excitation system. The dynamoelectric machine includes a stator core having two opposed ends and a plurality of stator slots extending along a stator axis. The stator bars are disposed in the stator slots and extend axially from one of the ends into an end winding region. A "P" bar is disposed in a pre-designated stator slot occupied in part by a stator bar, with the "P" bar also extending axially from that end into the end winding region. For purposes of this discussion, the end winding region is considered to have three sections. An inner section is close to the one end of the stator core wherein the "P" bar extends in a parallel direction to the stator bars. Then an outer section is near the farthest extremity of the stator bars and has a stator bar support means wherein said "P" bar again extends in a parallel direction to the stator bars. Between the inner section and the outer section is an intermediate section wherein the stator bars bend so that they lie tangentially in one direction about a frusto-conical surface of revolution concentric with the stator axis and the "P" bar bends in the opposite tangential direction about the surface of revolution, such that the "P" bar is positioned essentially perpendicular to the direction of the stator bars.

The improved "P" bar end winding support system includes the combination of a number of elements. There is a main support bracket, located at the inner section, affixed to a first plurality of stator bars and attached to the "P" bar through a low friction interface between the bracket and the "P" bar, such as to substantially restrain the "P" bar in the radial and circumferential directions and to provide a slip plane capable of accommodating relatively small differential thermal expansion displacements in the axial direction between said "P" bar and said stator bars. A pair of rails, each having a flat top surface and a flat bottom surface are located at the intermediate section and are affixed to a second plurality of stator bars in a direction substantially parallel to the direction of the "P" bar. They are spaced apart on either side thereof to form a track-like mounting base. Affixed to the top surfaces across one portion of the mounting base is a first end arm support bracket, which is affixed to the "P" bar. A second end arm support bracket is affixed to the top surface across another portion of said mounting base and is also affixed to the "P" bar. Finally, in the outer section, there is an outboard support bracket affixed to the stator bar support means and affixed to the "P" bar.

DESCRIPTION OF THE DRAWING

My invention is more clearly understood from the following description taken in conjunction with the accompanying drawing in which:

Referring now to FIG. 1, there is shown the fragmented development of the end winding region of a dynamoelectric stator wherein the end turns are the projecting portions of the stator bars 10 which extend outwardly from longitudinal stator slots (which, being conventional, are not shown) beyond the stator core line 30. The end turns are necessary in order to reverse the direction of the stator bars 10 and to circumferentially displace the end of the stator bar 10 so that it can enter a slot almost 180° (not shown) as is well known in the art, see for example the aforementioned Y. S. Hargett paper, page 16, column 2; see also U.S. Pat. No. 3,408,517—Willyoung, issued Oct. 29, 1968, from the slot from which it emerges. The end turns must also diverge radially from the stator axis in order that they will not obstruct the rotor of the dynamoelectric machine which is turning in the stator bore. Consequently, the stator end turns assume a rather complicated configuration in that they are skewed with respect to the stator axis and lie generally tangentially about a frusto-conical surface of revolution with the stator axis. There are typically two stator bars in each slot and, as far as the present invention is concerned, I intend to refer only to the "top" (radially inner) bars 10. "P" bar 12 is disposed in a predesignated stator slot occupied in part by a stator bar 10 with the "P" bar 12 also extending axially into the end winding region, as for example illustrated in the U.S. pat. application of Butman et al, U.S. Ser. No. 302,962, filed even date herewith and referenced above.

As the stator bars 10 and the "P" bar 12 emerge from the stator core line 30, the "P" bar 12 extends in a substantially parallel direction to the stator bars 10. I have designated this portion of the end winding region as the inner section. Located at the inner section is main support bracket 14 which is affixed to a plurality of stator bars 10 and attached to the "P" bar 12.

The next portion of the end winding region I have designated as the intermediate section, wherein the stator bars 10 bend so that they lie tangentially in one direction about a frusto-conical surface of revolution concentric with the stator axis, while the "P" bar bends in the opposite tangential direction about the surface of revolution, such that the "P" bar 12 is positioned essentially perpendicular to the direction of the stator bars 10.

Figure 1:
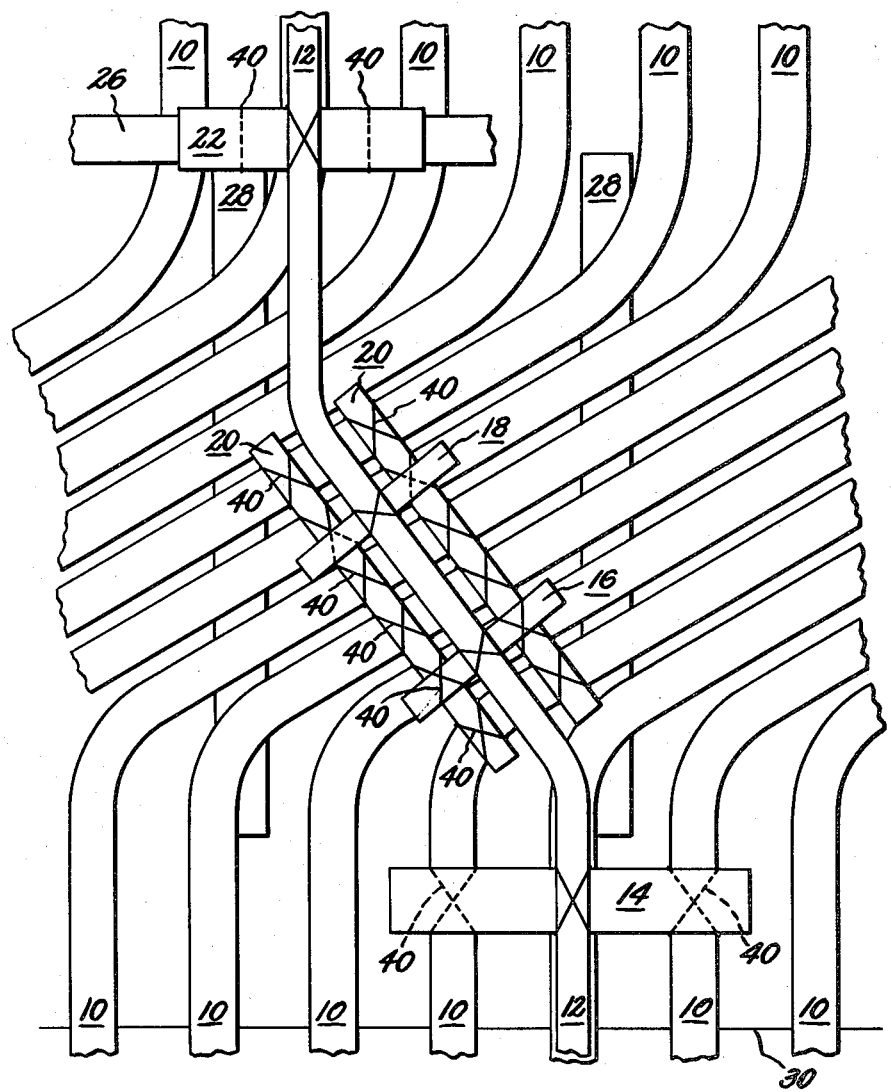
FIG. 1 is a radial view of a fragmented development of the end winding region illustrating the "P" bar end winding support system of the present invention.

This positional relationship between the stator bars 10 and the "P" bar 12 makes it difficult to secure first end arm support bracket 16 and second end arm support bracket 18 to the stator bars 10. I have thus found it necessary to construct a track-like mounting base, between stator bars 10 and brackets 16 and 18, from a pair of rails 20, each of which preferably has a flat top surface and a flat bottom surface. These rails 20 are generally fastened to the stator bars 10 by means of radial ties or wrapping 40. First end arm support bracket 16 is affixed to the top surfaces of one portion of the mounting base formed by the rails 20 by means of wrapping 40. Second end arm support bracket 18 is also affixed to another portion of the mounting base, suitably spaced from the first portion by means of such wrapping 40. The "P" bar is then affixed to the first end arm support bracket 16 and the second end arm support bracket 18 again by means of wrapping 40. The wrapping pattern is well known to a person skilled in the art and is preferably crosswise as shown. However, the wrapping is only crossed on the side in FIG. 1, while the opposite side is uncrossed. Nonetheless, each wrapping 40 does constitute a single loop.

In the outer section of the end winding region near their farthest extremity, the stator bars 10 are supported by a support means such as nose ring 26. In this section the "P" bar 12 again extends in a parallel direction to the stator bars 10. Here the "P" bar 12 is supported by outboard bracket 22 which is affixed to the nose ring 26 by a circular loop of wrapping 40 and is further fastened to "P" bar 12 by wrapping in a crosswise fashion. Additionally shown are outer axial supports 28 which are attached to the main frame of the machine.

Figure 2:
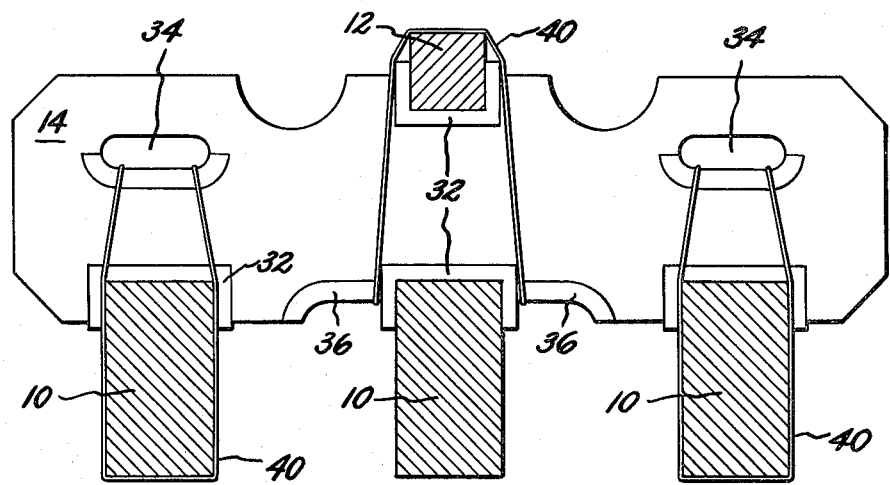
FIG. 2 is a cross-sectional view of the main support bracket as affixed to the stator bars and attached to the "P" bar.

FIG. 2 shows an axial cross-sectional view of the main support bracket 14. Bracket 14 preferably includes recesses into which the armature bars 10 are disposed so as to prevent circumferential motion of "P" bar 12. Likewise, "P" bar 12 is disposed in a recess or channel in the bracket 14. These recesses are also preferably lined with a conformable pad 32. These conformable pads 32 provide a more secure fit for both the armature bars 10 and the "P" bars 12. The preferred material is padding of a resin impregnated, substantially resilient material, such as a polyester felt, which is placed in the desired location. The felt, impregnated with for example an epoxy resin, is initially soft and shapable and then, after curing in situ, becomes hard and strong in comparison. Main bracket 14 is also provided with holes 34 through which the wrapping 40 is passed to secure bracket 14 to a pair of armature bars 10. These holes 34 preferably have a beveled edge as shown. Likewise, wrapping 40 also secures the "P" bar 12 to bracket 14 as shown and wrapping 40 extends over the bottom of the "P" bar across bevel 36 so as not to overly stress wrapping 40 along a sharp edge.

The low friction interface between the main bracket 14 and the "P" bar 12 is obtained by initially treating "P" bar 12 with a low friction, inert, heat stable coating (not shown) on all its surfaces. The material used in forming the coating must be relatively heat stable and it must be substantially inert. Therefore, no substance can be used which will corrode or attack any surface with which it makes contact. A suitable material is a fluorocarbon resin which may be brushed or sprayed on. The "P" bar 12, to which the coating has been applied, is then disposed on a low friction film of very smooth or glassy, relatively high-temperature, stable, inert material, such as a polyester or polyimide film.

Figure 3:
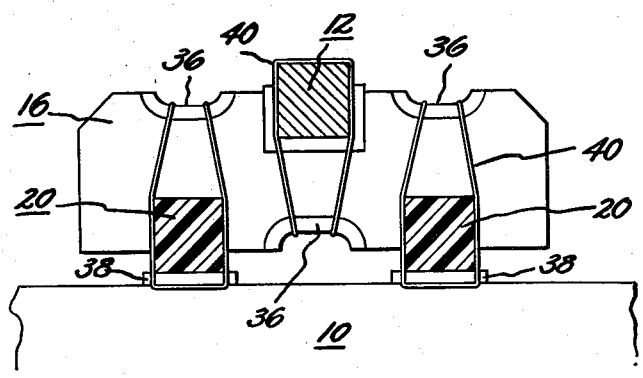
FIG. 3 is a cross-sectional view of one kind of end arm support bracket as affixed to the mounting base and affixed to the "P" bar.

FIG. 3 shows a cross-sectional view of first end arm support bracket 16 disposed across rails 20 which extend into the recesses in the bottom surfaces of the bracket 16, as shown. As above, beveled edges 36 are provided for strain relief. Also shown in FIG. 3 are conforming pads 38 which may comprise, for example, a resin impregnated material which is hardened when the stator assembly is subjected to a baking process. These pads 38 are held in place by wrapping 40, as also are rails 20.

Figure 4:
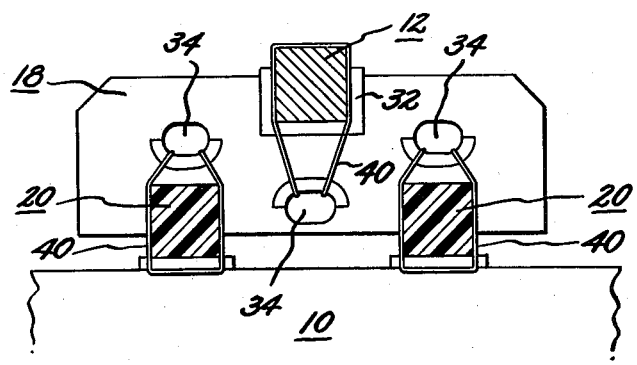
FIG. 4 is a cross-sectional view of another kind of end arm support bracket as affixed similar to that shown in FIG. 3.

FIG. 4 illustrates a second end arm support bracket 18 similar to the bracket 16 shown in FIG. 3 except that holes 34, also with beveled edges, are provided for attachment of the wrapping 40. Bracket 18, like the brackets 14 and 16, has pads of conformable material 32 or 38 (also see FIGS. 2 and 3) interposed between the bracket and the "P" bar, and between the armature bars 10 and rails 20, as shown.

Figure 5:
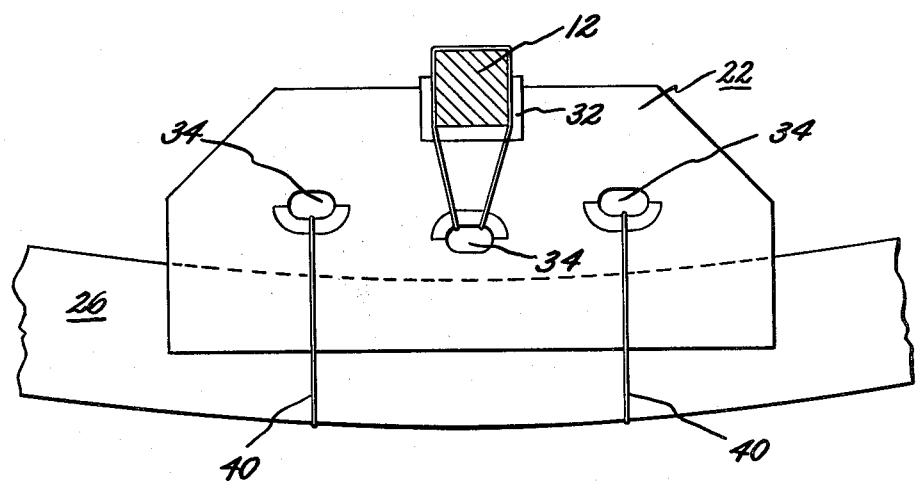
FIG. 5 is a cross-sectional view of an outboard support bracket as fastened to the nose ring and affixed to the "P" bar.

In FIG. 5 it is shown that outboard support bracket 22 is adapted to fit the curve of nose ring 26 and is fastened thereto by means of radial ties or wrapping 40 in the precured state consisting essentially of glass roving impregnated with a polyester resin as shown through holes 34 in the bracket 22. Likewise, wrapping 40 also holds the "P" bar 12 within the outboard support bracket 22.

Figure 6:
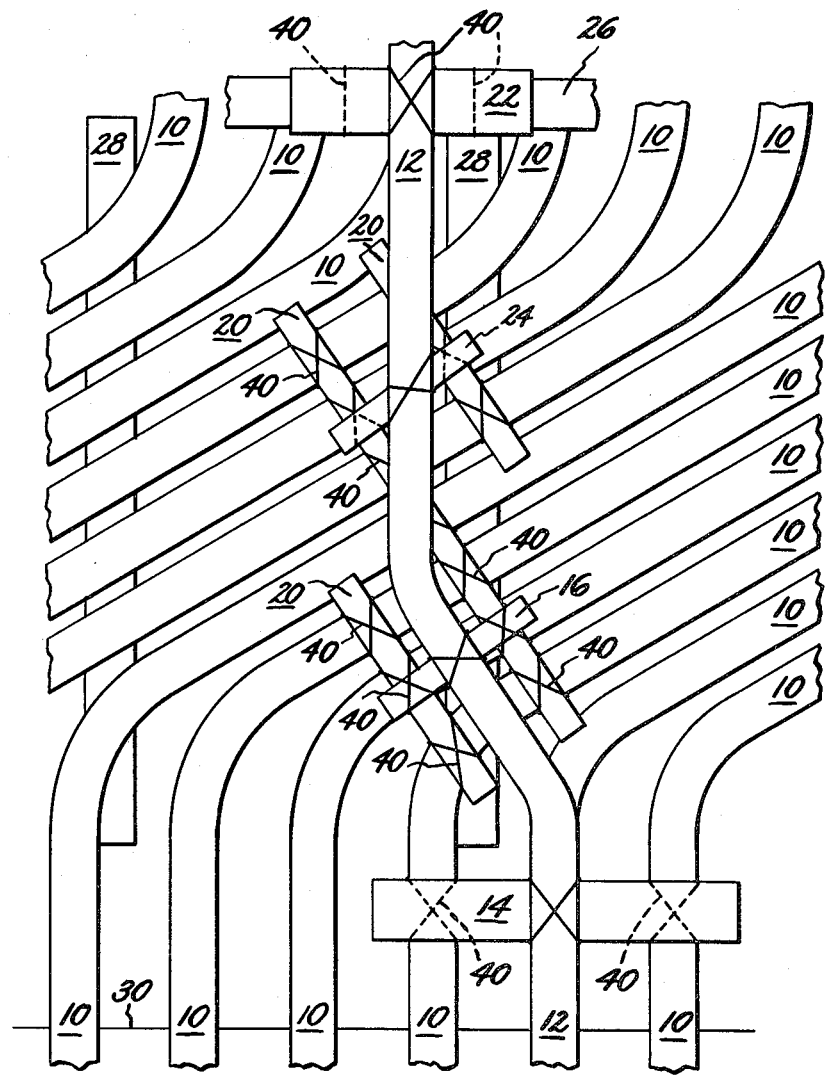
FIG. 6 is a radial view of a fragmented development illustrating another embodiment of the present invention.
Figure 7:
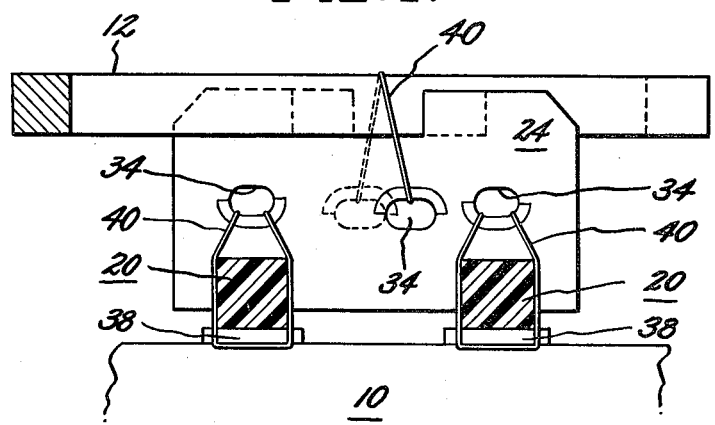
FIG. 7 is a cross-sectional axial view of a support bracket employed in the embodiment illustrated in FIG. 6.

FIG. 6 illustrates another embodiment of the present invention which is particularly applicable when the bends in the "P" bar 12 are spaced relatively close together. FIG. 6 also illustrates the fact that it is not necessary that the "P" bar 12 cross the end winding portion of the armature bars 10 at right angles for the entire length of the end winding region. Here brackets 14, 16 and 26 are described in FIGS. 2, 3 and 5, respectively. However, bracket 24, as shown in FIG. 7, is slightly different because of the angle at which "P" bar 12 crosses it. This angle requires that a recessed portion of bracket 24 be made at an angle to accommodate "P" bar 12. For purposes of clarity, armature bar ties, such as those that are described in the above-mentioned Coggeshall patent or the Gibbs et al patent are not shown in either FIGS. 1 or 6. Nonetheless, armature bar ties would generally be employed in such a machine.

From the above it may be appreciated that the present invention provides an end winding support system for the "P" bars of a dynamoelectric machine. The materials employed in this support system are completely compatible with the materials generally employed with the armature bar windings and other machine structures. In this regard, it bears noting that the "P" bar and the armature bars are generally both composed of individually insulated copper conductors, but that the insulation is not specifically shown herein for the sake of clarity. It is further seen that the structure disclosed in the present invention permits a certain degree of axial expansion due to thermal effects, while strongly resisting both radial and circumferential movements. Prior art "P" bar end winding support systems are not constructed in this way because they are not generally subjected to such potentially high stresses because of different excitation system designs.

While the invention has been described in detail herein in accord with certain preferred embodiments thereof, many modifications and changes therein may be effected by those skilled in the art. Accordingly, it is intended by the appended claims to cover all such modifications and changes which fall within the true spirit and scope of the invention.

What is claimed is:

1. In a dynamoelectric machine including: a stator core having two opposed ends and a plurality of stator slots extending along a stator axis;

stator bars disposed in the stator slots and extending axially from one of said ends into an end winding region;

a "P" bar disposed in a predesignated stator slot occupied in part by a stator bar, said "P" bar also extending axially from said one end into said end winding region;

said end winding region having three sections including: an inner section close to said one end of said stator core wherein said "P" bar extends in a parallel direction to said stator bars;

an outer section near the farthest extremity of the stator bars and having a stator bar support means wherein said "P" bar again extends in a parallel direction to said stator bars and an intermediate section between said inner section and said outer section, wherein said stator bars bend so that they lie tangentially in one direction about a frusto-conical surface of revolution concentric with said stator axis and said "P" bar bends in the opposite tangential direction about the surface of revolution, such that the "P" bar is positioned essentially perpendicular to the direction of the stator bars;

the improvement of a "P" bar end winding support system comprising:

(a) a main support bracket, located at said inner section, affixed to a first plurality of stator bars and attached to said "P" bar through a low friction interface between said bracket and said "P" bar such as to substantially restrain said "P" bar in the radial and circumferential directions and to provide a slip plane capable of accommodating relatively small differential thermal expansion displacements in the axial direction between said "P" bar and said stator bars;

(b) a pair of rails, each having a flat top surface and a flat bottom surface, located at said intermediate section affixed to a second plurality of stator bars in a direction substantially parallel to the direction of the "P" bar and spaced apart on either side thereof to form a track-like mounting base;

(c) a first end arm support bracket affixed to the top surfaces across one portion of said mounting base and affixed to said "P" bar;

(d) a second end arm support bracket affixed to the top surface across another portion of said mounting base and affixed to said "P" bar;

(e) an outboard support bracket affixed to the stator bar support means and affixed to said "P" bar.

2. The support system of claim 1, wherein said main support bracket, said pair of rails, said first end arm bracket, said second end arm bracket and said outboard bracket are secured by means of wrapping with radial ties.

3. The support system of claim 2, wherein said radial ties in the precured state consist essentially of glass roving impregnated with a polyester resin.

4. The support system of claim 3, wherein said resin has been cured in situ.

5. The support system of claim 2, wherein said main support bracket has a top surface having an upper recess adapted for disposing said "P" bar therein, and has a bottom surface having a plurality of lower recesses adapted for mounting on said stator bars; and wherein a pad of conformable material is present between said "P" bar and the upper recess of said bracket, and a pad of conformable material is present between each of said stator bars and the lower recesses of said bracket.

6. The support system of claim 5 wherein said low friction interface consists essentially of a low friction coating on the portion of said "P" bar disposed in said main bracket and a low friction film forming a sleeve surrounding said portion.

7. The support system of claim 2, wherein said first end arm bracket is substantially identical to said second end arm bracket.

8. The support system of claim 7, wherein each of said end arm brackets has a top surface having an upper recess adapted for disposing said "P" bar therein and has a bottom surface having a plurality of lower recesses adapted for mounting on said mounting base.

9. The support system of claim 2, wherein the stator bar support means includes a nose ring, and said outboard bracket is attached to said nose ring.

10. The support system of claim 9, wherein said outboard bracket has a top surface having an upper recess adapted for disposing said "P" bar therein and has a bottom surface having a recess adapted for mounting on said nose ring.

11. The support system of claim 10, wherein a pad of conformable material is present between said "P" bar and said outboard bracket.

* * * * *